Jan. 20, 1948.   T. B. STILLMAN   2,434,677
FLUID SEPARATOR
Filed Feb. 11, 1943
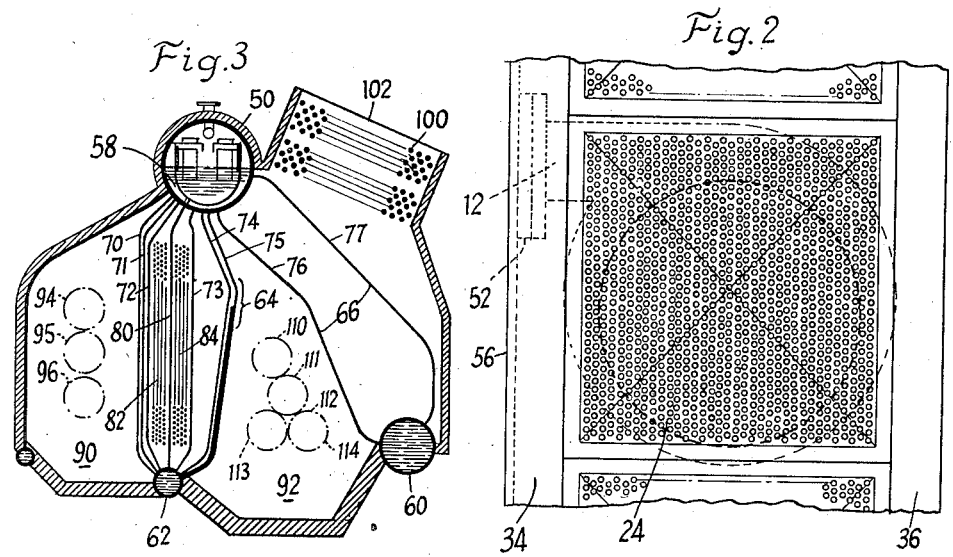
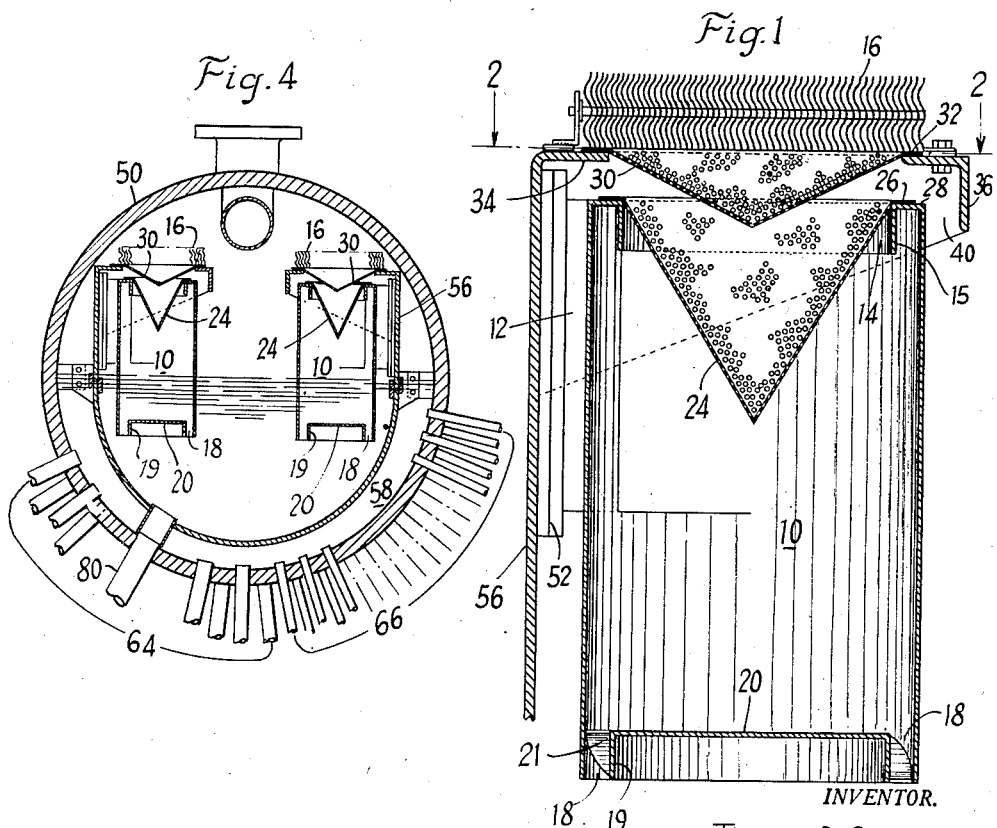
INVENTOR.
Thomas B. Stillman
BY
        ATTORNEY Patented Jan. 20, 1948

2,434,677

UNITED STATES PATENT OFFICE 2,434,677

FLUID SEPARATOR

Thomas B. Stillman, South Orange, N. J., assignor to The Babcock & Wilcox Company, Rockleigh, N. J., a corporation of New Jersey Application February 11, 1943, Serial No. 475,469

3 Claims. (Cl. 183—83)

This invention relates to improvements in devices for separating fluids of different densities. It is more specifically concerned with improvements in centrifugal means for the effective separation of such fluids.

An embodiment of the invention involves a whirl chamber into which a mixture of steam and water is tangentially discharged at high velocity, this action setting up rotation of the fluid within the whirl chamber. As a consequence, steam is separated from the water, and passes from the whirl chamber out of an upper steam outlet while the separated water is discharged through another outlet preferably disposed at the bottom of the chamber.

The invention contemplates the use of the illustrative separators in a steam generator and an object of the invention is to provide such separator means that such steam generators will be characterized by more effective separation of water and steam, even in spite of unsteady and widely fluctuating water level conditions in a steam and water drum in which the illustrative separators are employed.

A more specific object of the invention is to minimize or prevent the entrainment of water in the steam which passes from the illustrative separators.

Another object of the invention involves improvements in the illustrative steam and water separators used in conjunction with multiple plate auxiliary separators above the steam outlets of the whirl chamber separators. In this combination, the invention involves improvements whereby the percentage of entrained moisture reaching the inlet of such an auxiliary separator is minimized and the operation of the auxiliary separator is improved by more uniform loading thereof. The illustrative improvements also prevent any undesirable separation effects upon the auxiliary separator by reason of the centrifugal action within the whirl chamber. The illustrative improvement also accomplishes this result without in any way interfering with steam and water separation effect resulting from the whirling movement of the fluids within the whirl chamber.

The invention will be described with reference to an embodiment thereof shown in the accompanying drawings, and other objects of the invention will appear as the description proceeds.

In the drawings:

Fig. 1 is a vertical section through one of the illustrative steam and water separators;

Fig. 2 is a partial plan section on the plane indicated by the line 2—2 of Fig. 1;

Fig. 3 is a transverse vertical section of a water tube steam generator of the marine type, employing the illustrative steam and water separators; and Fig. 4 is a transverse vertical section of the steam and water drum in the Fig. 3 steam generator.

The illustrative separator includes a substantially circular whirl chamber 10 having a tangential inlet 12 through which steam and water mixtures normally pass at high velocity.

Due to the centrifugal action set up by the whirling of the fluid within the chamber 10, steam is separated from the water. This steam passes through a steam outlet 14 defined by circular depending flange 15 at the top of the whirl chamber.

Above the whirl chamber steam outlet is a multiple plate auxiliary separator 16, a substantial portion of the steam passing through this separator to the steam space of the drum.

The separated water is discharged downwardly from the whirl chamber through circumferentially arranged outlets 18 formed by the lower part of the wall of the whirl chamber, the cylindrical flange 19 of the whirl chamber bottom 20 and successive spaced metallic vanes 21 in the relatively narrow annular outlet passage.

Extending downwardly into the whirl chamber is an inverted metallic cone 24 having an upper flange 26 resting upon the angular top 28 of the whirl chamber. This cone is perforated, as shown, and its free flow area formed by the perforations is at least equal to the flow area of steam outlet 14. This cone does not extend beyond the normal vortex of the whirl chamber and it not only acts to provide a more uniform flow through the steam outlet 14 but also to intercept entrained droplets of water and allow them to drain back into the water space of the whirl chamber from the apex of the cone, the separated steam passing freely through the cone perforations.

To insure satisfactory steam quality even at high capacities and unstable drum water level conditions, an inverted auxiliary pyramid 30 is disposed across the inlet side of the auxiliary separator 16. It is maintained in this position by the clamping of its peripheral flange 32 between the auxiliary separator 16 and its supports 34 and 36 as particularly shown in Fig. 1. The auxiliary pyramid 30 is also perforated as indicated and it acts to separate and collect water droplets so that they will not pass upwardly to the auxiliary separator. It also promotes the removal of entrained moisture by guiding it laterally of the separator to the steam space of the drum through the auxiliary outlet 40 between the top of the whirl chamber and support 36.

It will be appreciated that the free flow area through the perforations of pyramid 30 is substantially less than the free flow area of cone 24, and both the pyramid and the cone, being effective to produce a more uniform loading of the auxiliary separator 16, break up any slugs of water which may sometimes start upwardly from the vortex of the whirl chamber. These slugs might be such that some of the water would pass into the auxiliary separator were it not for the pyramid or the cone, and in this way, these elements directly affect the functioning of the auxiliary separator.

The illustrative separators are preferably arranged within a steam and water drum 50 in the manner indicated in Figs. 3 and 4 of the drawings. Each separator inlet structure 12 is provided with a flange 52 for securement to a wall 56 of a steam and water drum inlet compartment 58. This compartment is substantially closed by diaphragms and plates and it is so arranged as to receive the steam and water mixtures from the steam generating tubes connecting the lower drums 60 and 62 directly to the drum 50. These steam generating tubes are preferably arranged in tube banks 64 and 66, some of the tubes being shown at 70—77. The bank of tubes 64 include large diameter tubes 80 supporting the superheater sections 82 and 84, and the combined structure separates the superheater furnace 90 from the main furnace 92. In normal operation of the steam generator, burners 94—96 heat the superheater furnace 90, and the furnace gases pass across the superheater and the tubes of the bank 64 and thence across the upper parts of the tubes of the bank 66 to the economizer 100 and thence to the gas outlet 102. The major part of the steam generated in this installation results from the operation of the burners 110—113 of the main furnace 92.

What is claimed is:

1. In a fluid separator, an upright cylindrical whirl chamber casing open at the top to provide an outlet for separated fluid of lesser density, a tangential whirl chamber inlet through which a mixture of different density fluids enters the whirl chamber at high velocity, an auxiliary separator spaced from the top of the whirl chamber to form a supplementary and lateral outlet therebetween for separated fluid of lesser density, said auxiliary separator receiving separated fluid of lesser density from the whirl chamber outlet, a perforated metallic distributor baffle covering the inlet side of the auxiliary separator but leaving substantially free communication between the supplementary outlet and the whirl chamber outlet, and a secondary perforated metallic distributor baffle extending into the whirl chamber and across the flow of separated fluid of lesser density to the whirl chamber outlet, each of said baffles being of V-section with its apex presented downwardly, the total free flow area of the perforations of this secondary baffle being at least equal to the flow area of the whirl chamber outlet.

2. In a fluid separator, means forming a whirl chamber, means forming a tangential whirl chamber inlet through which a mixture of different density fluids enters the whirl chamber at high velocity and sets up whirling action therein, spaced whirl chamber outlets for separated fluids of different densities, said outlets including a bottom outlet for fluid of greater density and a top outlet for fluid of lower density, a multiple plate auxiliary separator above the top outlet and spaced from the top of the whirl chamber to form a supplementary and lateral fluid outlet therebetween, and a perforated metallic baffle construction covering the inlet side of the auxiliary separator and being operatively disposed between the auxiliary separator and all of the lateral outlet, said baffle construction being of inverted cap-shape and having a V-shaped section in any plane extending through the upright axis of the baffle.

3. In a whirl chamber separator for fluids of different densities, means forming an upright whirl chamber having a substantially tangential inlet through which flows a high velocity mixture of different density fluids, means forming an outlet toward the bottom of the whirl chamber for separated fluid of high density, a scrubber type auxiliary separator disposed above the whirl chamber and across the upward flow of separated fluid of lesser density, the auxiliary separator being spaced vertically from the top of the whirl chamber to form an auxiliary side outlet for fluid, and an inverted cap-like baffle of perforated metal extending across the upward flow of separated fluid of lesser density and operatively disposed between all of said side outlet and the auxiliary separator so that all fluid passing to the auxiliary separator must have passed through the baffle, said baffle construction also having upwardly diverging surfaces disposed so as to direct impact fluid of high density toward said side outlet.

THOMAS B. STILLMAN.

REFERENCES CITED

The following references are of record in the file of this patent:

UNITED STATES PATENTS

| Number | Name | Date |
|---|---|---|
| 727,480 | Stevens | May 5, 1903 |
| 383,801 | Downton | May 29, 1888 |
| 2,298,285 | Fletcher | Oct. 13, 1942 |

FOREIGN PATENTS

| Number | Country | Date |
|---|---|---|
| 9,630 | Great Britain | Apr. 20, 1911 |